(12) United States Patent
Nakajima et al.

(10) Patent No.: US 7,713,464 B2
(45) Date of Patent: May 11, 2010

(54) MULTILAYER CONTAINER OF POLYGLYCOLIC ACID AND POLYESTER AND BLOW MOLDING PRODUCTION PROCESS

(75) Inventors: Junji Nakajima, Ibaraki (JP); Takafumi Kato, Ibaraki (JP); Yoshihiro Matsukura, Ibaraki (JP)

(73) Assignee: Kureha Corporation, Tokyo (JP)

( * ) Notice: Subject to any disclaimer, the term of this patent is extended or adjusted under 35 U.S.C. 154(b) by 8 days.

(21) Appl. No.: 10/494,132

(22) PCT Filed: Nov. 1, 2002

(86) PCT No.: PCT/JP02/11464

§ 371 (c)(1),
(2), (4) Date: Apr. 30, 2004

(87) PCT Pub. No.: WO03/037624

PCT Pub. Date: May 8, 2003

(65) Prior Publication Data

US 2005/0011892 A1    Jan. 20, 2005

(30) Foreign Application Priority Data

Nov. 1, 2001    (JP) .............................. 2001-336601

(51) Int. Cl.
*B29C 45/00*    (2006.01)
*C08J 5/00*    (2006.01)
(52) U.S. Cl. ................. 264/513; 264/523; 264/535; 264/537; 264/328.1; 264/328.8; 264/328.12; 264/328.16; 264/331.21

(58) Field of Classification Search .................. None
See application file for complete search history.

(56) References Cited

U.S. PATENT DOCUMENTS

| | | | | |
|---|---|---|---|---|
| 4,565,851 A | * | 1/1986 | Barbee | 525/437 |
| 4,710,118 A | * | 12/1987 | Krishnakumar et al. | 425/130 |
| 5,853,639 A | * | 12/1998 | Kawakami et al. | 264/177.19 |
| 5,908,917 A | * | 6/1999 | Kawakami et al. | 528/354 |
| 5,928,742 A | * | 7/1999 | Sugiura et al. | 428/35.7 |

(Continued)

FOREIGN PATENT DOCUMENTS

EP    0806283    11/1997

(Continued)

*Primary Examiner*—Jeffrey Wollschlager
(74) *Attorney, Agent, or Firm*—Porter Wright Morris & Arthur LLP

(57) ABSTRACT

The invention provides a multilayer container that comprises a polyglycolic acid layer and a thermoplastic polyester resin layer and is much improved in terms of gas barrier properties, heat resistance, moldability, transparency and durability, and its production process. Polyglycolic acid is used as a gas barrier resin. At the body and bottom, the thermoplastic polyester resin forms an inner and an outer layer, and an intermediate layer comprising at least one polyglycolic acid layer is embedded in the thermoplastic polyester resin layer. The opening end of the container is formed of a thermoplastic polyester resin layer alone, and the body is biaxially oriented. The multilayer container has heat resistance enough to stand up to hot-filling at 93° C. for 20 seconds.

7 Claims, 2 Drawing Sheets

U.S. PATENT DOCUMENTS

| | | | | |
|---|---|---|---|---|
| 6,001,439 | A * | 12/1999 | Kawakami et al. | 428/35.7 |
| 6,159,416 | A * | 12/2000 | Kawakami et al. | 264/531 |
| 6,217,818 | B1 * | 4/2001 | Collette et al. | 264/513 |
| 6,245,437 | B1 * | 6/2001 | Shiiki et al. | 428/483 |
| 6,562,276 | B1 * | 5/2003 | Shelby et al. | 264/328.8 |
| 6,589,662 | B1 * | 7/2003 | Itatani et al. | 428/473.5 |
| 6,673,403 | B1 * | 1/2004 | Shiiki et al. | 428/35.7 |
| 7,056,565 | B1 * | 6/2006 | Cai et al. | 428/36.7 |
| 2004/0065984 | A1 * | 4/2004 | Ota et al. | 264/530 |

FOREIGN PATENT DOCUMENTS

| | | | |
|---|---|---|---|
| EP | 0909640 | | 4/1999 |
| EP | 0925915 | | 6/1999 |
| GB | 2188272 | | 9/1987 |
| JP | 56-064839 | | 6/1981 |
| JP | 57-128516 | | 8/1982 |
| JP | 61-47337 | | 3/1986 |
| JP | 62-027424 | | 2/1987 |
| JP | 62-199425 | | 9/1987 |
| JP | 10-138371 | | 5/1998 |
| JP | 2001-150524 | | 6/2001 |
| WO | WO98/10932 | * | 3/1998 |
| WO | 9846410 | | 10/1998 |
| WO | WO0010790 | * | 3/2000 |
| WO | WO01/39956 | * | 6/2001 |

* cited by examiner

MULTILAYER CONTAINER OF POLYGLYCOLIC ACID AND POLYESTER AND BLOW MOLDING PRODUCTION PROCESS

TECHNICAL FIELD

The present invention relates generally to a multilayer container that at least comprises a polyglycolic acid layer and a thermoplastic polyester resin layer, and more specifically to a multilayer container that has a structure wherein an intermediate layer comprising at least one. polyglycolic acid layer is embedded in a thermoplastic polyester resin layer, and is improved in terms of gas barrier properties, heat resistance, moldability, transparency and durability. The present invention is also concerned with a process for producing said multilayer container by co-injection stretch blow molding. The multilayer container according to the invention, taking advantage of its properties, finds applications as containers for drinks and foods such as carbonated fruit juices, lactic drinks, beers, wines, soy sauces, sauces, jams, jellies, soups, and salad oils.

BACKGROUND ART

In recent years, blow molded containers of thermoplastic resins have been developed in the form of containers for a variety of drinks and foods. Now, single-layer PET bottles comprising polyethylene terephthalate (PET) are commonly used as such blow molded containers.

However, the PET bottles are found to be less than satisfactory for containers for stuffs sensitive to oxygen, and so are required to have gas barrier properties in general, and carbonic acid gas barrier properties for carbonated beverages as well. When liquid food stuffs such as jams, jellies and fruit sauces are packed in blow molded containers, this is generally achieved by hot-filling. Also carbonated fruit juices or lactic drinks, etc. are heat sterilized by hot-water showering upon packed in blow molded containers. Thus, the blow molded containers are required to have properties high enough to stand up to heat and pressure. To sum up, the blow molded containers must possess high gas barrier properties and heat resistance enough to be resistant to hot-filling.

To improve the gas barrier properties of blow molded containers, some processes have already been proposed, wherein a multilayer container with a gas barrier resin layer provided in an intermediate layer is formed by blow molding.

JP-A 56-64839 proposes a multilayer container production process wherein a container precursor having a multilayer structure comprising an outer PET layer and an inner PET layer with an intermediate layer formed of a methaxylene group-containing polyamide resin, and then subjected to biaxial stretch blow molding.

JP-A 57-128516 comes up with a blow molded container having a multilayer structure comprising at least two thermoplastic resins, wherein at least a thin portion of its body has a three- or multi-layer structure, at least the end of its opening has a single structure, and at least the thin portion of its body has a biaxially oriented multilayer structure. This publication describes that PET is used as the thermoplastic resin that forms the inner and outer layers and the end of the opening, and EVOH or a methaxylene group-containing polyamide resin is used for the intermediate layer.

JP-A 62-199425 discloses a process for producing a biaxially stretched container, wherein a multilayer pre-molding article comprising an inner PET layer and an outer PET layer with at least one intermediate layer comprising a gas barrier resin is subjected to biaxially stretch blow molding in a mold held at a thermally fixed temperature and the blow molded article is heat treated, after which the blow molded article is cooled and removed from the mold. An example where EVOH and a xylene group-containing polyamide resin are used is set forth in that publication.

Since the 1990s, multilayer containers having a structure of, for instance, PET/EVOH/PET or PET/MXD6/PET layer construction and obtained by co-injection stretch blow molding, for instance, in container forms for beers or wines, have already been commercially put on the market.

Since EVOH has a melting point close to a thermal decomposition temperature, a high melt viscosity, etc., however, it is considerably difficult to subject EVOH in combination with PET to co-injection stretch blow molding. More exactly, it is difficult to determine conditions for co-injection stretch blow molding of two such resins, because there is a large difference in proper molding temperature between them. Upon high temperature injection, for instance, the melting temperature becomes high by crosslinking (gelation) of EVOH, ending up with instable melt flows. This inevitably causes the intermediate layer or the EVOH layer to vary largely in thickness, and implanting height (height from the bottom of a bottle to the tip of the EVOH layer) to become unsatisfactory or vary, resulting in lack of gas barrier properties and defective appearance.

On the other hand, MXD6 nylon that is a typical methaxylene group-containing polyamide resin possesses very excellent co-injection capability when used in combination with PET, because of having a melting point close to that of PET. In addition, since both resins have an approximate glass transition temperature, it is easy to determine a proper molding temperature for stretch blow molding. However, MXD6 nylon is less satisfactory than EVOH in terms of gas barrier properties, and so a blow molded container with an MXD6 nylon intermediate layer does not lend itself to applications where oxygen barrier properties are needed over an extended period of time or high gas barrier properties are demanded.

JP-A 61-47337 discloses a process for producing a multilayer bottle of layer construction comprising PET/HBR/PET by co-injection stretch blow molding, wherein a resin obtained by polycondensation of dimethyl terephthalate and ethylene glycol is mixed with a resin obtained by ring-opening of glycolide at various mixing ratios, the mixture is melt polymerized to obtain a polymer (HBR) having high gas barrier properties, and the HBR and PET are subjected to co-injection stretch blow molding. However, the oxygen gas barrier properties of the HBR set forth in that publication is not sufficiently elevated, say, on the order of $2.3 \times 10^{-13}$ $cm^3 \cdot cm/cm^2 \cdot sec \cdot cmHg$ at best, as estimated by an oxygen permeability coefficient ($PO_2$) measured at 25° C. That publication says nothing specific to a heat-resistant blow molded container having heat resistance enough to stand up to hot-filling.

JP-A 10-138371 discloses a gas barrier, multilayer hollow container having a multilayer wall construction wherein a thermoplastic resin layer is laminated on at least one side of a layer formed of polyglycolic acid. That publication sets forth a process for producing a multilayer hollow container by multilayer extrusion blow molding, multilayer injection blow molding or the like, and gives a specific example of producing a multilayer hollow container comprising an inner PET layer and an outer PET layer with a polyglycolic acid intermediate layer interleaved between them via an adhesive layer by means of co-injection stretch blow molding. With such multilayer hollow containers produced by co-injection stretch blow molding as described in that publication, however, there is still much to be desired in terms of co-injection stretch blow molding conditions, gas barrier properties, durability, heat resistance, moldability, etc. More specifically, the problems to be challenged are to enhance durability by reliable embedding of a polyglycolic acid layer that is susceptible to decompose under environmental conditions in a thermoplastic resin layer, improve gas barrier properties, and achieve heat resistance enough to stand up to hot-filling.

DISCLOSURE OF THE INVENTION

A primary object of the invention is to provide a multilayer container that is much more improved in terms of gas barrier properties, heat resistance, moldability, transparency and durability, and its production process.

The inventors have carried out an extensive investigation with a view towered achieving the above object. As a result it has been found that a multilayer container that at least comprises a polyglycolic acid layer and a thermoplastic polyester resin layer, and has a high level of gas barrier properties and heat resistance enough to stand up to hot-filling and excellent in transparency as well can be obtained by using a polyglycolic acid excellent in gas barrier properties as an intermediate layer, and embedding the polyglycolic acid entirely in the thermoplastic polyester resin layer so that the polyglycolic acid layer is protected from hydrolysis, etc., while the type of thermoplastic polyester resin and molding conditions for co-injection stretch blow molding are selected.

The inventors have also found that relations among melt viscosities of the respective resins upon co-injection molding as well as suitable ranges for temperature conditions, stretch factors, etc. upon stretch blow molding can be properly determined by a combined use of polyglycolic acid and thermoplastic polyester resin. Further, the inventors have found that if the biaxial orientation of a container body is thermally fixed during stretch blow molding where, for instance, PET is used as the thermoplastic polyester resin, then heat resistance can be much more improved. Such findings have underlain the present invention.

Thus, the present invention provides a multilayer container that at least comprises a polyglycolic acid layer and a thermoplastic polyester resin layer, wherein:

(a) said polyglycolic acid is a gas barrier resin that contains a repeating unit represented by formula (1) at a proportion of at least 60% by weight and has an oxygen permeability coefficient of up to $5.0 \times 10^{-14}$ (cm$^3$·cm/cm$^2$·sec·cmhg) as measured at a temperature of 23° C. and a relative humidity of 80% pursuant to JIS K-7126, Formula (1)

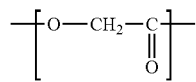

(b) at a body and a bottom of the multilayer container, the thermoplastic polyester resin forms an inner layer and an outer layer, (c) at the body and the bottom of the multilayer container, an intermediate layer comprising at least one polyglycolic acid layer is embedded in the thermoplastic polyester resin layer, (d) an end of an opening in the multilayer container is formed of a thermoplastic polyester resin layer alone, (e) the body of the multilayer container is biaxially oriented, and (f) the multilayer container is of heat resistance enough to stand up to hot-filling at 93° C. for 30 seconds.

The present invention also provides a multilayer container production process involving the steps of co-injecting at least polyglycolic acid and a thermoplastic polyester resin to form a bottomed multilayer preform, and then subjecting said multilayer preform to biaxial stretch blow molding, thereby producing a multilayer container, characterized in that:

(I) said polyglycolic acid is a gas barrier resin that contains a repeating unit represented by formula (1) at a proportion of at least 60% by weight and has an oxygen permeability coefficient of up to $5.0 \times 10^{-14}$ (cm$^3$·cm/cm$^2$·sec·cmHg) as measured at a temperature of 23° C. and a relative humidity of 80% pursuant to JIS K-7126, Formula (1)

(II) a molding machine equipped with a plurality of injection cylinders is used to co-inject resin melts through one gate into a single preform mold cavity by successive or concurrent molding in one clamping operation, thereby making a bottomed, multilayer preform comprising (A) an inner layer and an outer layer, each composed of a thermoplastic polyester resin layer, (B) an intermediate layer comprising at least one polyglycolic acid layer and embedded in the thermoplastic polyester resin layer, (C) an end of an opening formed of a thermoplastic resin layer alone, and (D) the rest comprising a three- or multi-layer construction, (III) if necessary, the end of the opening in the multilayer preform is heat treated to crystallize the thermoplastic polyester resin layer, and (IV) after regulated to a temperature at which stretch is possible, the multilayer preform is inserted into a blow mold cavity where the multiform preform is blow molded while a pressurized fluid is blown thereinto.

BEST MODE FOR CARRYING OUT THE INVENTION

1. Polyglycolic Acid

Figure 1:
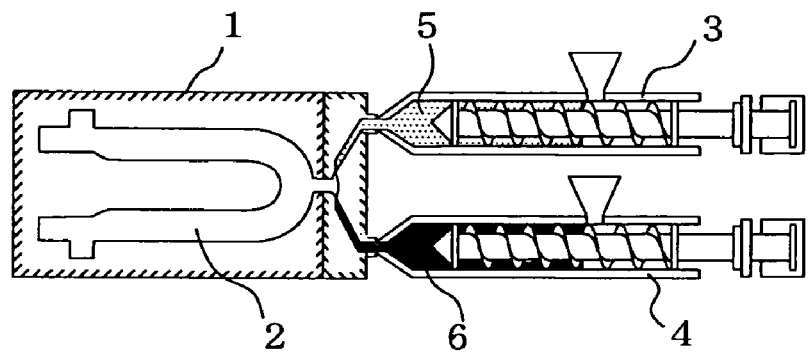
FIGS. 1, 2, 3 and 4 are illustrative in section of typical examples of co-injection molding.
Figure 2:
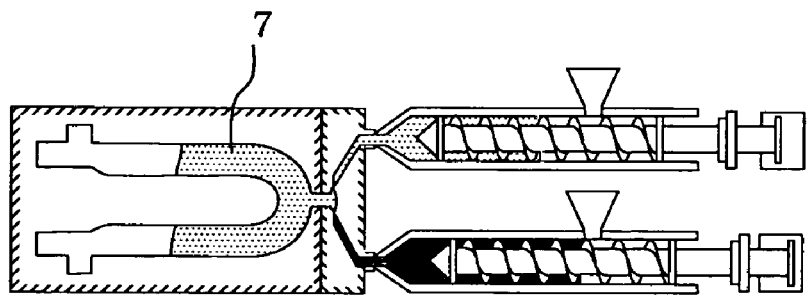
Figure 3:
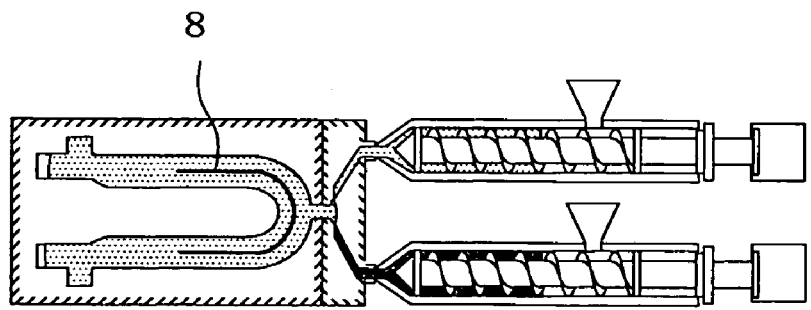
Figure 4:
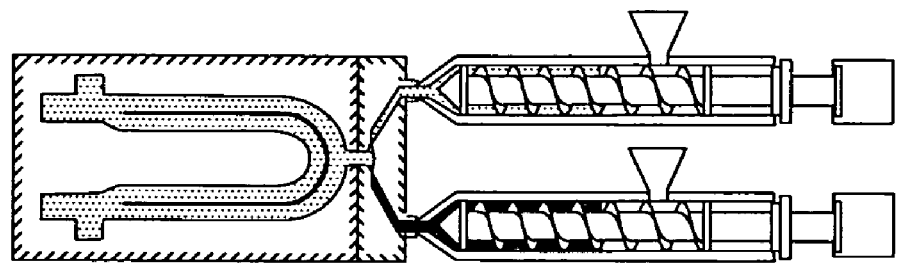

The polyglycolic acid used herein is a homopolymer or copolymer containing a repeating unit represented by the following formula (1):

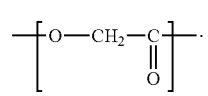

The proportion of the repeating unit having formula (1) contained in the polyglycolic acid is at least 60% by weight, preferably at least 70% by weight, and more preferably at least 80% by weight, with the upper limit placed at 100% by weight. As the proportion of the repeating unit having formula (1) is too low, gas barrier properties and heat resistance drop.

In addition to the repeating unit having formula (1), the polyglycolic acid may contain at least one of repeating units such as those represented by the following formulae (2) to (6).

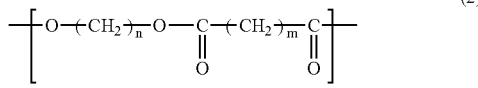 (2)

Where n is equal 1 to 10 and m is equal 0 to 10.

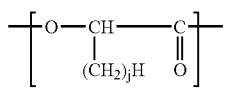 (3)

Where J is equal 1 to 10.

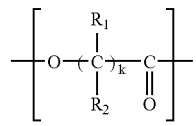 (4)

Where $R_1$ and $R_2$ are each independently a hydrogen atom or an alkyl group having 1 to 10 carbon atoms, and k is equal to 2 to 10.

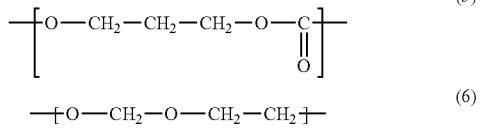 (5) (6)

If other repeating units having formulae (2) to (6) are introduced in the polyglycolic acid at a proportion of at least 1% by weight, then the melting point of a poly-glycolic acid homopolymer can be lowered. With a decrease in the melting point of the polyglycolic acid, it is possible to lower its processing temperature and, hence, reduce its thermal decomposition upon melt processing. The crystallization rate of a polyglycolid acid can be controlled by copolymerization, so that its processability can be improved. As the proportion of the other repeating units contained in the polyglycolic acid becomes too high, crystallinity inherent in polyglycolic acid is adversely affected, producing harmful influences on gas barrier properties, etc.

Polyglycolic acids may be synthesized by dehydration and polycondensation of glycolic acid, dealcoholization and polycondensation of an alkyl ester of glycolic acid, ring-opening polymerization of glycolide, etc. Among these, preference is given to the synthesis of polyglycolic acids by a ring-opening polymerization process wherein glycolide is heated to a temperature of about 120° C. to about 250° C. in the presence of a small amount of a catalyst (e.g., cationic catalysts such as tin organic carboxylates, tin halogenides and antimony halogenides) for ring-opening. The ring-opening polymerization should preferably rely on bulk polymerization or solution polymerization.

According to each of the above synthesis processes, copolymers of polyglycolic acid may be synthesized by copolymerization of glycolide, glycolic acid or an alkyl ester of glycolic acid in suitable combinations with a comonomer or comonomers such as cyclic monomers, for instance, ethylene oxalate, lactide, lactones (e.g., β-propiolactone, β-butyrolactone, pivalolactone, γ-butyrolactone, δ-valerolactone, β-methyl-δ-valerolactone, ε-caprolactone), trimethylene carbonate and 1,3-dioxane; hydroxycarboxylic acids, for instance, lactic acid, 3-hydroxypropanoic acid, 3-hydroxybutanoic acid, 4-hydroxybutanoic acid and 6-hydroxycaproic acid, or an alkyl ester thereof; a substantially equimolar mixture of an aliphatic diol such as ethylene glycol or 1,4-butanediol and an aliphatic dicarboxylic acid such as succinic acid and adipic acid or an alkyl ester thereof.

The polyglycolic acid used herein should have an oxygen permeability coefficient of up to $5.0 \times 10^{-14}$ cm$^3$·cm/cm$^2$·sec·cmHg as measured at a temperature of 23° C. and a relative humidity (RH) of 80% persuant to JIS K-7126. With a polyglycolic acid having too large an oxygen permeability coefficient, it is impossible to obtain any multilayer container excellent in oxygen gas barrier properties. In most cases, the polyglycolic acid used herein should have an oxygen permeability coefficient in the range of $1.0 \times 10^{-14}$ to $5.0 \times 10^{-14}$ cm$^3$·cm/cm$^2$·sec·cmHg.

The polyglycolic acid used herein should also have a melt viscosity of preferably 100 to 1,500 Pa·s, and more preferably 150 to 800 Pa·s, as measured at a temperature of 240° C. and a shear rate of 100 sec$^{-1}$.

Upon molten at a temperature exceeding 255° C., polyglycolic acid is likely to decompose, resulting in a molecular weight drop and foaming. For this reason, it is preferable to set the melt processing temperature of poly-glycolic acid at about 240° C. When the melt viscosity of polyglycolic acid is too low or too high at 240° C., it is difficult to determine any proper molding conditions for co-injection of the polyglycolic acid and thermoplastic polyester resin.

The polyglycolic acid used herein should have a melting point (Tm) of preferably 200° C. or higher, and more preferably 210° C. or higher. A polyglycolic acid has a melting point of about 220° C., a glass transition temperature of about 38° C. and a crystallization temperature of about 91° C. However, it is understood that those thermal properties of polyglycolic acid fluctuate in dependence on its molecular weight, copolymerizable component, etc.

In the invention, the neat resin of the polyglycolic acid may be used by itself; however, it is noted that a resin composition comprising inorganic fillers, other thermoplastic resins, plasticizers, etc. added to the polyglycolic acid may be used in a range that is not detrimental to the object of the invention. In addition and if necessary, various additives such as heat stabilizers, light stabilizers, moistureproofing agents, waterproofing agents, water repellent agents, lubricants, releasing agents, coupling agents, pigments and dyes may be added to the polyglycolic acid.

2. Thermoplastic Polyester Resin

For the thermoplastic polyester resin used herein, thermoplastic polyester resins other than the polyglycolic acid may be used. Among others, preference is given to thermoplastic aromatic polyester resins that are composed mainly of aromatic dicarboxylic acids or their alkyl esters and glycols.

Preferred thermoplastic aromatic polyester resins, for instance, include polyethylene terephthalate (PET), and polyethylene naphthalate (PEN), and mixtures thereof.

PET is a thermoplastic polyester resin having a melting point of about 255° C., a glass transition temperature of about 76° C. and a crystallization temperature of about 170° C.

PEN is a thermoplastic polyester resin having a melting point of about 256° C., a glass transition temperature of about 120° C. and a crystallization temperature of about 220° C.

Besides, use may be made of copolyesters in which a part of the acid component in PET is replaced by isophthalic acid or naphthalene dicarboxylate, copolyesters in which a part of the glycol component in PET is replaced by a special diol such as diethylene glycol, etc.

For the thermoplastic polyester resin, it is acceptable to use aliphatic polyesters other than the polyglycolic acid, for instance, polylactic acid (with a melting point of about 178° C., a glass transition temperature of about 53° C. and a crystallization temperature of about 103° C.), etc. In applications where durability is needed, however, it is preferable to use the thermoplastic aromatic polyester resins.

The thermoplastic polyester resin should have an inherent viscosity (IV value) of usually 0.5 to 1.5 dl/g, preferably 0.6 to 1.0 dl/g, and more preferably 0.7 to 0.85 dl/g. The IV value (dl/g) of the thermoplastic polyester resin may be found by measuring that of a solution of 0.5% by weight of resin in o-chlorophenol or a phenol/chloroethane (60/40% by weight) mixed solvent at 30° C. using Canon Ubbelohde Type 1B Viscometer pursuant to ASTM D4603-96.

The thermoplastic polyester resin should also have a melt viscosity (1) of preferably 100 to 300 Pa·s, and more preferably 120 to 250 Pa·s, as measured at a temperature of 280° C. and a shear rate of 100 sec$^{-1}$.

If required, the thermoplastic polyester resin may contain various additives such as inorganic fillers, other thermoplastic resins, heat stabilizers, light stabilizers, moistureproofing agents, waterproofing agents, water repellent agents, lubricants, releasing agents, coupling agents, pigments and dyes.

3. Clay for Nano-Composite

According to the invention, inorganic fillers may be added to the thermoplastic polyester resin, if desired. Among others, it is preferable to add clay for nano-composites to the thermoplastic polyester resin.

Preferable clays for nano-composites are natural smectite purified from bentonite, and primarily montmorillonite. Among others, particular preference is given to montmorillonite that has an aspect ratio of preferably 200 or higher, more preferably 300 or higher, with a limited content of impurities such as silica.

A thermoplastic polyester resin composition, in which 0.5 to 5% by weight of clay for nano-composites is dispersed in the thermoplastic polyester resin, is a clay hybrid material that can have improved heat resistance with no detriment to the transparency of a thermoplastic polyester resin layer. For instance, the use of PET with the clay for nano-composites dispersed in it contributes to a 20 to 30° C. improvement in heat deformation temperature.

The clay for nano-composites may be processed into a hybrid material by dispersion in the thermoplastic polyester resin by known intercalation, melt mixing with the thermoplastic polyester resin, or the like.

4. Desiccant

By use of the desiccant, it is possible to prevent hydrolysis of polyglycolic acid due to entrance of moisture from within and without the multilayer container.

By way of example but not by way of limitation, the desiccants used herein include inorganic compounds such as sodium secondary phosphate, calcium chloride, sodium chloride, ammonium chloride, potassium carbonate, sodium nitrate, magnesium chloride and magnesium sulfate, and organic compounds such as cane sugar. In place of the desiccant, it is acceptable to use high water absorption resins such as a crosslinked polyacrylic acid (salt) and a crosslinked starch/acrylic acid salt graft copolymer.

5. Multilayer Container

The multilayer container of the invention comprises a polyglycolic acid layer excellent in oxygen gas barrier properties and a thermoplastic polyester resin layer. At the body and bottom of the multilayer container of the invention, an inner and an outer thermoplastic polyester resin layer are provided, and at the body and bottom of the multilayer container, an intermediate layer comprising at least one polyglycolic acid layer is embedded in the thermoplastic polyester resin layer. The end of an opening in the multilayer container is formed of a thermoplastic polyester resin layer alone, and the body of the multilayer container is biaxially oriented. Further, the multilayer container is of heat resistance enough to stand up to a 20-second hot-filling at 93° C.

Figure 5:
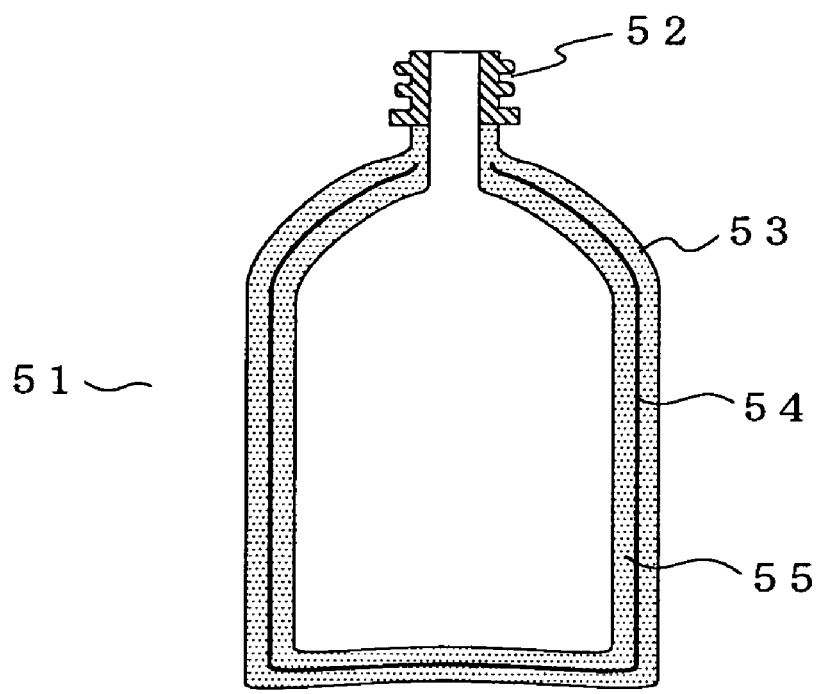
FIG. 5 is illustrative in section of one embodiment of the multilayer container according to the invention.

FIG. 5 is illustrative in section of one embodiment of the multilayer container of the invention. A multilayer container 51 is constructed of an opening end 52, a body and a bottom. At the body and bottom of the multilayer container, an outer layer 53 and an inner layer 55 are each formed of a thermoplastic polyester resin layer, and an intermediate layer 54 is formed of a poly-glycolic acid layer.

The opening end 52 (mouth) of the multilayer container is formed of a single thermoplastic polyester resin layer. Therefore, the polyglycolic acid layer 54 is entirely embedded in the thermoplastic polyester resin. Generally, polyglycolic acids are good at oxygen gas barrier properties and carbonic acid gas barrier properties. In the invention, it is noted that a poly-glycolic acid having particularly improved oxygen gas barrier properties is used. However, polyglycolic acids are biodegradable polymers sensitive to hydrolysis. For this reason, a multilayer container comprising only a combination of a polyglycolic acid layer with other resin layer is likely to undergo degradation from the opening end. If the polyglycolic acid layer is embedded in the thermoplastic polyester resin layer, then effective prevention of degradation by hydrolysis, etc. of the poly-glycolic acid layer is achievable.

The height of the multilayer container from its bottom to the tip of the polyglycolic acid layer is here called the "implanting height". This "implanting height" should preferably be kept constant at a height near to the opening end and during molding. Fluctuations in the implanting height at the time of molding gives rise to a lowering of gas barrier properties, because the resultant multilayer container does not include a polyglycolic acid layer portion just only at the opening end but also at the shoulder.

While the polyglycolic acid layer of FIG. 5 is a single layer, it is understood that the polyglycolic acid layer may comprise two or more layer units. By way of example but not exclusively, some multilayer constructions are set out below. Notice that "PGA" stands for a poly-glycolic acid layer, and "Polyester" a thermoplastic polyester resin.

Polyester/PGA/Polyester,
Polyester/PGA/Polyester/PGA/Polyester, and
Polyester/PGA/Polyester/PGA/Polyester/PGA/Polyester.

The respective thermoplastic polyester resin layers may be formed of the same type of thermoplastic polyester resin or different types of thermoplastic polyester resins. For instance, the thermoplastic polyester resin 55 that gives the inner layer may be formed of a neat resin, whereas the thermoplastic polyester resin 53 that gives the outer layer may be formed of a thermoplastic polyester resin (resin composition)

with additives such as UV absorbers and coloring agents added thereto. Besides, a regrind layer comprising molding scraps may be additionally provided as an intermediate layer. If desired, the thermoplastic polyester resin may contain a clay for nano-composites.

Often, the polyglycolic acid layer comprises one or two layer units. By use of two or more polyglycolic acid layer units, the gas barrier properties of the multilayer container can be enhanced, even when their total thickness is substantially equal to that of the single layer.

The thickness of the total layers that form the body (side wall) of the multilayer container may properly be determined depending on what it is used for; however, that total thickness is of the order of usually 100 µm to 5 mm, preferably 150 µm to 3 mm, and more preferably 300 µm to 2 mm.

In applications where heat resistance or heat resistance and pressure resistance are needed, multilayer containers must have a thicker body. For instance, a heat-resistant bottle or heat-resistant, pressure-resistant bottle of 1.5 L has a weight of the order of 50 to 60 g. On the other hand, an aseptic packing bottle may have a thin body because of being filled up at normal temperature and pressure; a 1.5 L bottle may have a weight of the order of 40 to 50 g.

The total thickness of the thermoplastic polyester resin layers is of the order of usually 50 µm to 4.5 mm, preferably 100 µm to 2.5 mm, and more preferably 200 µm to 1 mm. The total thickness of the intermediate polyglycolic acid layers is usually 5 µm or greater, preferably 5 to 200 µm, and more preferably 10 to 100 µm. Although the polyglycolic acid layer may be used in a single layer form, it may be provided in a split barrier layer wherein the polyglycolic acid layer is split into two or more units. When the polyglycolic acid layer is provided in a single layer form, it is preferable to locate that layer somewhat outside of the central portion of multilayer construction, because what is filled is often a fluid.

The opening end 52 of the multilayer container should preferably be configured in such a way as to be capped by a lid. Upon heat treatment of this opening end 52, the thermoplastic polyester resin may be crystallized. The crystallization of the opening end should preferably be done at a preform-making stage prior to stretch blow molding. A bottomed, multilayer preform is formed by co-injection, and the opening end of that multilayer preform is then heated to about 200° C. by near-infrared irradiation for crystallization.

In most cases, such crystallization yields spherulites that make the opening end white and opaque. The thermoplastic polyester resin that forms the opening end has a crystallinity of usually 25% by volume or greater, and preferably 30% by volume or greater. Especially when PET is used as the thermoplastic polyester resin, it is preferable to crystallize the opening end by heat treatment in favor of the gas barrier properties and heat resistance of the multilayer container.

The body of the multilayer container should preferably be thermally fixed by heat treatment in a biaxially oriented state. Especially when PET is used as the thermoplastic polyester resin, it is desired that the biaxially oriented state of the body be thermally fixed by heat treatment upon stretch blow molding. Such thermal fixation ensures that heat resistance enough to stand up to hot-filling at 80° C. or higher is given to the body.

However, it is understood that a multilayer container that is obtained using as the thermoplastic polyester resin a resin having excellent heat resistance such as PEN to make up a layer construction such as PEN/PGA/PEN or PEN/PGA/PEN/PGA/PEN can provide a heat-resistant bottle that can be hot-filled and have improved UV barrier properties and gas barrier properties, even without recourse to crystallization of the opening end of a multilayer preform by heat treatment or thermal fixation of the body or the whole of the container by heat treatment.

The body of the multilayer container according to the invention should preferably have transparency as represented by a haze value of 4.0% or lower.

6. Production Process of Multilayer Container

According to the invention, a multilayer container is produced by co-injecting at least a polyglycolic acid and a thermoplastic polyester resin to form a bottomed, multilayer preform and then subjecting the multilayer preform to biaxial stretch blow molding. For the poly-glycolic acid, a gas barrier resin is used, which contains the repeating unit having the aforesaid formula (1) at a proportion of at least 60% by weight and has an oxygen permeability coefficient of up to $5.0 \times 10^{-14}$ $cm^3 \cdot cm/cm^2 \cdot sec \cdot cmHg$ as measured at a temperature of 23° C. and a relative humidity of 80% pursuant to JIS K-7126.

At the step of producing the multilayer preform, a molding machine equipped with a plurality of injection cylinders is used to co-inject the respective resin melts through one gate into a single preform mold cavity by successive or concurrent molding in one clamp operation. At this step, a bottomed, multilayer preform is prepared, which comprises (A) an inner layer and an outer layer, each composed of a thermoplastic polyester resin layer, (B) an intermediate layer comprising at least one polyglycolic acid layer and embedded in the thermoplastic polyester resin layer, (C) the end of an opening formed of a thermoplastic resin layer alone, and (D) the rest comprising a three- or multi-layer construction.

When it comes to the successive molding process, the respective resin melts are injected through the associated cylinders at different injection timings in a continuous, alternate manner, so that the previously injected thermoplastic polyester resin forms an inner and an outer layer, and the subsequently injected poly glycolic acid forms an intermediate layer, thereby preparing a multilayer preform.

Referring to the concurrent molding process, the respective resin melts are injected through the associated cylinders at such varied injection timings that the thermoplastic polyester resin is first injected, during which the polyglycolic acid is injected at some point, so that both resins are concurrently and continuously injected to prepare a multilayer preform in which an inner and an outer layer are made up of the thermoplastic polyester resin and the an intermediate layer is made up of the polyglycolic acid.

The successive molding process is now explained more specifically with reference to FIGS. 1 to 4. First, a portion of a thermoplastic polyester resin 5 is injected through an injection cylinder 3 in a cavity 2 in a mold 1. Once the injection of the thermoplastic polyester resin 5 is stopped, polyglycolic acid 6 is injected through another injection cylinder 4 into a thermoplastic polyester resin 7 molten in the cavity 2. The poly-glycolic acid forms a polyglycolic acid layer 8 in the thermoplastic polyester resin 7 in a molten state. Finally, another portion of the thermoplastic polyester resin 5 is again injected through the injection cylinder 3 to fill up the mold cavity entirely. In this way, there is obtained a multilayer preform that is sealed at its bottom with the thermoplastic polyester resin.

With the successive molding process wherein the thermoplastic polyester resin, polyglycolic acid and thermoplastic polyester resin are injected successively in this order, it is possible to obtain a multilayer preform made up of two resins/five layers, and having a layer construction of polyester/PGA/polyester/PGA/polyester. When the final injection of the thermoplastic polyester resin is intentionally stopped at the gate, there is obtained a multilayer preform made up of two resins/three layers, and having a layer construction of polyester/PGA/polyester.

With the concurrent molding process, a multilayer preform made up of two types of resins and three layers is generally obtainable. By application of the successive or concurrent molding process in various manners with more injection cylinders, varying molding conditions, etc., it is possible to prepare multilayer preforms having a number of multilayer constructions.

At the step of molding mutilayer preforms by the concurrent molding process, the melt viscosities of the respective resins upon co-injection should preferably be controlled such that the ratio ($\eta_T/\eta_P$) of the melt viscosity ($\eta_T$) of the thermoplastic polyester resin to the melt viscosity of ($\eta_P$) of the polyglycolic acid, as measured at the melting temperatures of the respective resins and the shear rate of $100 \text{ sec}^{-1}$, is 1 or lower.

At the step of molding multilayer preforms by co-injection molding in the concurrent molding process, for instance, two different resins flow through the mold cavity in a laminar state. Here, if the melt viscosities of both resins in a molten state are controlled, then the inner and outer layers will be formed of the thermoplastic polyester resin and the intermediate (core) layer will be formed of the polyglycolic acid. To this end, it is desired that control be carried out such that the melt viscosity of the thermoplastic polyester resin becomes lower than that of the polyglycolic acid. The melt viscosity ratio ($\eta_T/\eta_P$) should preferably be in the range of 0.3 to less than 1. The preferable melt viscosity ratio can be adjusted by control of the type and melting temperature (injection temperature) of each resin.

When the thermoplastic polyester resin is PET, the resin temperature upon co-injection molding is usually in the range of 265 to 290° C. In the case of the poly-glycolic acid, on the other hand, the resin temperature upon co-injection molding is usually in the range of 225 to 260° C. Within the range of the respective resin temperatures, it is desired that control be conducted such that the melt viscosities of the respective resins meet the above relations.

Preferably in the invention, the opening end of the multilayer preform is heat treated for crystallization of thermoplastic polyester resin layer. Often, the opening end of a bottomed, multilayer preform has a single thermoplastic polyester resin layer structure, and so is less than satisfactory in terms of heat resistance and gas barrier properties. For this reason, it is desired that prior to subjecting the preform to stretch blow molding, the opening end be heated to about 200° C. by irradiation with infrared rays as an example for crystallization. The post-crystallization crystallinity of the thermoplastic polyester resin at the opening end is usually 25% by volume or greater, and preferably 30% by volume or greater.

In the invention, use may also be made of a process wherein a resin having a high glass transition temperature, such as a polycarbonate or polyallylate resin, is injection molded into a mouth piece, and the mouth piece is then insert molded into the opening end of the preform, thereby improving the heat resistance of the mouth of the multilayer container.

The multilayer preform is then subjected to stretch blow molding. At the stretch blow molding step, the multilayer preform is regulated at a temperature at which it is stretchable, and then inserted into a blow mold cavity, where stretch blow molding is carried out with a pressurized fluid such as air blown therein. Stretch blow molding may be carried out in either a hot-parison method or a cold-parison method. It is here noted that the "parison" means a preform.

After preheating, a pressurized air such as compressed air is blown in the bottomed, multilayer preform heated to a stretch temperature for expansion and stretching. In general, the stretch factor is of the order of 1.5 to 3 in the axial direction and 3 to 5 in the circumferential direction. Although varying slightly depending on stretch blow molded containers (blow molded bottles), the blow-up ratio (total stretch factor) is of the order of 6 to 9 for general-purpose blow molded bottles, 8 to 9.5 for pressure-resistance bottles, 6 to 7.5 for heat-resistant bottles, and 7 to 8 for large bottles.

For crystalline resins, stretch blow molding is generally carried out in the temperature range of the glass transition temperature to the crystallization temperature inclusive of the resins. When the thermoplastic polyester resin is a non-crystalline resin like PETG, stretch blow molding is conducted in the temperature range of the glass transition temperature (about 81° C. for PETG) to the melting temperature (about 180° C. or higher for PETG) inclusive of the resin, because there is no definite crystallization temperature or melting point.

When the thermoplastic polyester resin is PET, compressed air is blown in the multilayer preform at a temperature ranging from the glass transition temperature to the crystallization temperature inclusive of PET, preferably at a temperature of 80 to 170° C., wherein a stretching rod is inserted for biaxial stretching in the axial (longitudinal) and circumferential (lateral) directions. The intermediate polyglycolic acid layer has a glass transition temperature of about 38° C., and so is easily stretchable following the stretching of the thermoplastic polyester resin that forms the inner and the outer layer.

At the stretch blow molding step, it is desired that while the mold has been heated to a temperature of 100° C. or higher, the biaxially oriented body of the multilayer container be thermally fixed simultaneously with stretch blow molding. Heat treatment occurring in the mold heated to such a high temperature ensures that the biaxially oriented state is thermally fixed and, at the same time, the crystallization of the thermoplastic polyester resin progresses. The heat treatment also ensures that internal distortion resulting from the stretch blow molding step is relaxed, ending up with promoted orientation and crystallization. Unlike large pherulites created by the heat treatment of the opening end, the oriented crystals in the body well keep transparency, even when the orientation and crystallization of the body are promoted. The post-thermal fixation crystallinity of the body sidewall is usually 28% by volume or higher.

Especially when PET is used as the thermoplastic polyester resin, the thermal fixation should preferably be done in favor of heat resistance. When a multilayer container having heat resistance well fit for hot-filling is produced, the body of the multilayer container is heat treated (thermally fixed) in a stretch blow mold simultaneously with stretch blow molding, while the mold has been heated to a temperature of 100° C. or higher, for the purpose of preventing thermal shrinkage and deformation of the container at the time of hot-filling. More specifically, the mold is heated to a temperature of 100 to 165° C., and preferably 145 to 155° C. for general-purpose heat-resistant containers and 160 to 165° C. for containers of high heat resistance. Although varying with the thickness of multilayer containers and the heat treatment temperature applied, a heat treatment time of usually 1 to 30 seconds, and preferably 2 to 20 seconds is used.

For heat treatment in the mold, several processes may be used; one carried in a single-stage molding method wherein stretch blow molding and thermal fixation take place in a single mold, another process in a two-stage blow method wherein a multilayer container subjected to primary stretch blow molding is removed from a mold and thermally fixed, and then subjected to secondary stretch blow molding in a secondary mold, yet another process in an oven blow method, etc. When the heat treatment is carried out at the time of stretch blow molding, the resultant multilayer container is removed from within the mold after fully cooled.

EXAMPLES

The present invention is now explained more specifically with reference to inventive examples as well as comparative examples. Various physical properties and other properties are measured and evaluated as follows.

(1) Melt Viscosity ($\eta$):

A sample was prepared by crystallization of an about 0.2 mm thick non-crystalline sheet of each resin by a 5-minute heating at 150° C. Using Capillograph 1C (die=1 mm$\phi$×10 mmL) made by Toyo Seiki Co., Ltd., the melt viscosity of the sample was measured at a shear rate of 100 sec$^{-1}$ and at a resin temperature of 240° C. for poly-glycolic acid and 280° C. for PET.

(2) Glass Transition Temperature, Crystallization Temperature, and Melting Point:

Glass transition temperature, crystallization temperature, and melting point were measured using. DSC7 made by Perkin Elmer Co., Ltd. pursuant to JIS K-7121. The heating rate and the cooling rate were alike 20° C./min.

(3) Crystallinity:

About 5 g of sample were cut out of the crystallized portion of a multilayer container, and then precisely weighed. This sample was inserted into a densitometer AccuPyc 1330 made by Shimadzu Corporation to measure its density. This meter is designed to measure volume using helium gas, and as the aforesaid weight is entered therein, density is automatically indicated. Based on density measurement, crystallinity is calculated. The measurement temperature is 23° C.

(4) Oxygen Permeability Coefficient:

Measurement was carried out at a temperature of 23° C. and 80% RH pursuant to JIS K-7126, using Oxtran 2/20 made by Modern Controls Co., Ltd.

(5) Oxygen Permeability of Multilayer Container:

Using a multilayer container having a volume of 1,500 ml on Oxtran-100 made by Modern Controls Co., Ltd., the oxygen permeability of the multilayer container was measured at a measurement temperature of 20° C. while the inside of the container was kept at 100% RH (relative humidity) and the outside at 65% RH.

(6) Moldability:

For instance, whether or not there were fluctuations in the implanting height of the intermediate layer (the height of a bottle from its bottom to the tip of a poly-glycolic acid layer) was observed to make estimations on the following ranks:
A: Superior Moldability,
B: General-Duty Moldability, and
C: Inferior Moldability.

(7) Heat Resistance:

Hot water of 80° C. was hot-filled in a multilayer container, which was then allowed to stand alone for 1 minute. How the opening end and the body of the multilayer container were deformed or shrunk was observed to make estimations on the following ranks:
A: Neither deformation nor shrinkage was observed, and
B: Deformation or shrinkage was observed.

(8) Transparency:

The body of a multilayer container was cut out, and its haze value was measured to make estimations on the following ranks:
A: A haze value of 4.0% or less,
B: A haze value exceeding 4.0 but not exceeding 5.0%, and
C: A haze value exceeding 5.0%.

Example 1

A homopolymer (with a glass transition temperature of 38° C., a melting point of 221° C. and a crystallization temperature of 91° C.) having a melt viscosity [$\eta_P$] of 500 Pa·s, as measured at a temperature of 240° C. and a shear rate of 100 sec$^{-1}$, was used for polyglycolic acid. This polyglycolic acid had an oxygen permeability coefficient (PO$_2$) of 2.5×10$^{-14}$ cm$^3$·cm/cm$^2$·sec·cmHg, and a carbonic acid permeability coefficient (PCO$_2$) of 8.9×10$^{-14}$·cm$^3$·cm/cm$^2$·sec·cmHg, the latter being measured using a double-side moistening gas permeability tester made by GL Sciences Inc.

A PET (with an IV value of 0.8 dl/g, a glass transition temperature of 75° C., a melting point of 252° C. and a crystallization temperature of 150° C.) having a melt viscosity [$\eta_T$] of 190 Pa·s, as measured at a temperature of 280° C. and a shear rate of 100 sec$^{-1}$, was used for a thermoplastic polyester resin.

After pre-dried for full removal of moisture, these resins were co-injection molded in a mold cavity by the successive molding process using a co-injection molding machine (a renovated version of ASB-250T made by Nissei Co., Ltd.) for two different resins/five layers wherein the leading portion of an injection cylinder on an inner/outer layer (PET) side was set at a temperature of 280° C., the leading portion of an injection cylinder on an intermediate layer (polyglycolic acid) side at a temperature of 240° C. and a merging hot runner block at a temperature of 265° C., thereby preparing a bottomed preform having a multilayer structure wherein the end of an opening had a single PET layer structure and the intermediate polyglycolic acid layer was embedded in the PET layer. Layer construction was a five-layer one of PET/PGA/PET/PGA/PET.

The opening end of this multilayer preform was heated by infrared irradiation to 200° C. for crystallization. Then, stretch blow molding was carried out by blowing compressed air in a stretch blow mold cavity at a resin temperature of 160° C. and a stretch factor (blow-up ratio) of about 6 (about 2 in an axial direction and about 3 in a circumferential direction). While the mold had been heated to a temperature of 160° C., a multilayer container was heat treated for 5 seconds at the time of stretch blow molding, thereby thermally fixing the whole container including its body.

After that, the compressed air was changed over to cooling air which was regulated to a temperature of 5° C. for internal cooling and then flowed through the mold, immediately whereupon the multilayer container was removed from the mold, and then slowly cooled, thereby obtaining a multilayer container product having an internal volume of 1,500 ml and a PET/PGA/PET/PGA/PET layer construction, wherein the opening end had a single PET layer, the body and bottom were formed of the polyglycolic acid layer and the polyglycolic acid layer was embedded in the PET layer.

The weight of the preform was about 50 g. The total layer thickness of the multilayer container product was 330 µm, the total thickness of the inner and outer layers and the intermediate PET layer was 300 µm, and the thickness of the polyglycolic acid layers was 15 µm for each layer and 30 µm in all.

The crystallinity of the opening end of the multilayer container product was 31% by volume or greater.

Example 2

Example 1 was repeated with the exception that the injection of PET was intentionally stopped at a gate portion at the time of preparing a preform by co-injection. In this way, there was obtained a multilayer container product which had a layer construction of PET (100 μm)/PGA (30 μm)/PET (200 μm) as viewed from the outer layer and in which the opening end was made up of a single PET layer, the body and the bottom were each made up of a polyglycolic acid layer and a polyglycolic acid layer was embedded in the inner and the outer PET layer. The weight of the preform was about 50 g, the total layer thickness of the multilayer container product was 330 μm, the total PET layer thickness of the inner and outer layers was 300 μm, and the thickness of the polyglycolic acid was 30 μm.

Comparative Example 1

A multilayer container product was molded as in Example 2 with the exception that MXD6 nylon (P-6001 made by Mitsubishi Gas Chemistries Co., Ltd. with a melting point of 243° C., a glass transition temperature of 75° C., a crystallization temperature of 163° C. and an MI of 7 g/10 minute) was used in place of the polyglycolic acid. However, the leading end of an injection cylinder on the inner/outer layer (PET) side was set at a temperature of 280° C., the leading end of an injection cylinder on the intermediate layer (MXD6 nylon) side at 260° C., and a merging hot runner block at 270° C. The weight of the preform was about 50 g, the total layer thickness of the body of the multilayer container product was 330 μm, the total thickness of the inner and outer PET layers was 300 μm, and the thickness of the MXD6 nylon layer was 30 μm.

Comparative Example 2

A multilayer container product was molded as in Example 2 with the exception that EVOH resin (DC3212 made by Nippon Synthesis Chemistries Co., Ltd. with a melting point of 183° C., a glass transition temperature of 61° C., a crystallization temperature of 160° C. and an MI of 12 g/10 minute) was used in place of the polyglycolic acid. However, the leading end of an injection cylinder on the inner/outer layer (PET) side was set at 270° C., the leading end of an injection cylinder on the intermediate layer (EVOH) side at 200° C., and a hot runner block where PET and EVOH merged together at 260° C. The weight of the preform was about 50 g, the total thickness of the body of the container was 330 μm, the total thickness of the inner/outer PET layers was 300 μm, and the thickness of the EVOH layer was about 30 μm.

Comparative Example 3

A multilayer container product was molded as in Example 2 with the exception that neither was crystallization of the opening end of the preform conducted, nor was any heat treatment carried out in the mold upon stretch blow molding. The weight of the preform was about 50 g, the total layer thickness of the body of the multilayer container product was 330 μm, the total thickness of the inner/outer PET layers was 300 μm, and the thickness of the polyglycolic acid was 30 μm.

Example 3

In Example 1, a polyethylene terephthalate (PEN) homopolymer (with a melting point of 265° C., a glass transition temperature of 120° C. and a crystallization temperature of 220° C.) was used in place of the PET, and neither was the crystallization of the opening end of the preform conducted, nor was the thermal fixation of the container body carried out in the mold. Otherwise, Example 1 was repeated to prepare a multilayer container product. This multilayer container product had heat resistance enough to stand up to not only hot-filling but also boiling, and improved oxygen gas barrier properties as well.

Example 4

A multilayer container product was prepared as in Example 1 with the exception that a PET/clay nano-composite (PET containing 3% by weight of clay for nano-composites) obtained according to the method set forth in ANTEC 2000 pp-2412 was used in place of PET. The resultant multilayer container product was somewhat higher in oxygen permeability than that of Example 1, and had heat resistance enough to stand up to not only hot-filling but also boiling as well as improved oxygen gas barrier properties.

TABLE 1

|  | Examples ||| Comparative Examples |||
|---|---|---|---|---|---|---|
|  | 1 | 2 | 3 | 1 | 2 | 3 |
| Body sidewall of container |  |  |  |  |  |  |
| Layer construction | PET/PGA/PET/PGA/PET | PET/PGA/PET | PEN/PGA/PEN | PET/MXD6/PET | PET/EVOH/PET | PET/PGA/PET |
| Thickness (μm) | 330 | 330 | 330 | 330 | 330 | 330 |
| PET layer (total) | 300 | 300 | 300 | 300 | 300 | 300 |
|  | (3 layers) | (2 layers) | (2 layers) | (2 layers) | (2 layers) | (2 layers) |
| Other layer (total) | 30 | 30 | 30 | 30 | 30 | 30 |
|  | (2 layers) | (1 layer) | (1 layer) | (1 layer) | (1 layer) | (1 layer) |
| Stretch factor |  |  |  |  |  |  |
| Blow-up ratio | about 6 | about 6 | about 6 | about 6 | about 6 | about 6 |
| Axial direction | about 2 | about 2 | about 2 | about 2 | about 2 | about 2 |
| Circumferential direction | about 3 | about 3 | about 3 | about 3 | about 3 | about 3 |

TABLE 1-continued

| | Examples | | | Comparative Examples | | |
|---|---|---|---|---|---|---|
| | 1 | 2 | 3 | 1 | 2 | 3 |
| Opening end | | | | | | |
| Heat treatment | applied | applied | not applied | applied | applied | not applied |
| Crystallinity (vol. %) | ≧30 | ≧30 | — | ≧30 | ≧30 | — |
| Thermal fixation (145° C./10 sec) | applied | applied | not applied | applied | applied | not applied |
| Oxygen permeability (cc/bottle'day) | 0.005 | 0.007 | 0.004 | 0.03 | 0.01 | 0.005 |
| Moldability | A | A | A | B | C | A |
| Heat resistance at 93° C. for 20 seconds | A | A | A | A | A | B |
| Transparency | A | B | A | C | C | A |

With the multilayer container product (Comp. Ex. 2) wherein the intermediate layer was used in combination with the EVOH layer, molding was difficult to achieve, because of poor flowability and stretchability of resins under molding conditions, defective appearances due to variations in the thickness distribution of the EVOH layer and fluctuating implanting height, and unsatisfactory heat stability.

The multilayer container product of Example 1 has improved oxygen permeability, because the intermediate layer is divided into two layer units to achieve a split barrier system.

The above examples were carried out in the hot-parison method; however, even when the cold-parison method was applied to both the layer constructions of Examples 1 and 2, it was found that satisfactory results were alike obtainable.

The multilayer container or stretch blow molded product of Example 3 had heat resistance enough to stand up to boiling treatments even without recourse to the crystallization of the opening end and the heat treatment of the container body in the mold, because PEN was used for the thermoplastic polyester resin.

INDUSTRIAL APPLICABILITY

The present invention provides a multilayer container significantly improved in terms of gas barrier properties, heat resistance, moldability, transparency and durability, and its production process. Having by far higher oxygen, and carbonic acid gas barrier properties, the multilayer container of the invention may be used in the form of various bottles, wide-mouthed bottles, cups or the like. The multilayer container of the invention has also heat resistance enough to stand up to hot-filling.

The invention claimed is:

1. A multilayer container production process comprising the steps of co-injecting at least polyglycolic acid and a thermoplastic polyester resin to form a bottomed multilayer preform, and then subjecting said multilayer preform to biaxial stretch blow molding, thereby producing a multilayer container having a heat resistance sufficient to withstand hot-filling at 93° C. for 20 seconds, wherein a body of the multilayer container is formed of layers having a total thickness of 150 μm-3 mm and has a haze value not exceeding 50% and wherein:

(I) said polyglycolic acid is a gas baffler resin that contains a repeating unit represented by formula (1) at a proportion of at least 60% by weight, has a melt viscosity ($\eta_P$) of 150 to 800 Pa·s as measured at a temperature of 240° C. and a shear rate of 100 sec$^{-1}$ and is hydrolysable, and has an oxygen permeability coefficient of up to 5.0× 10$^{-14}$ cm$^3$·cm/cm$^2$·sec·cm Hg as measured at a temperature of 23° C. and a relative humidity of 80%,

(1)

Formula (1) and said thermoplastic polyester resin is at least one thermoplastic aromatic polyester resin selected from the group consisting of polyethylene terephthalate (PET) and polyethylene naphthalate (PEN), and has an inherent viscosity of 0.6 to 1.0 dl/g and a melt viscosity ($\eta_T$) of 100 to 300 Pa·s as measured at a temperature of 280° C. and a shear rate of 100 sec$^{-1}$, (II) in the co-injecting step, a molding machine equipped with a plurality of injection cylinders is used to co-inject resin melts through one gate into a single preform mold cavity by successive or concurrent molding in one clamping operation, wherein the polyglycolic acid resin temperature upon co-injection molding is in the range of 225 to 260° C., wherein (a) when the multilayer preform is prepared by successive molding, respective molten resins are injected through associated cylinders at such varied timings that said molten resins are continuously and alternately injected so that a previously injected thermoplastic polyester resin is formed into the inner and outer layers and a subsequently injected polyglycolic acid is formed into the intermediate layer, and (b) when the multilayer preform is prepared by concurrent molding, respective molten resins are injected through the associated cylinders at such varied timings that the thermoplastic polyester resin is first injected, during which the polyglycolic acid is injected at some point so that both resins are concurrently and continuously injected to form the thermoplastic polyester resin into the inner and outer layers and the polyglycolic acid into the intermediate layer, thereby making a bottomed, multilayer preform comprising (A) an inner layer and an outer layer, each composed of a thermoplastic polyester resin layer, (B) an intermediate layer comprising at least one polyglycolic acid layer and embedded in the thermoplastic polyester resin layers without interleaving an adhesive layer between the polyglycolic acid layer and the thermoplastic polyester resin layers, (C) an end of an opening formed of a thermoplastic polyester resin layer alone, and (D) the rest comprising a three- or multi-layer construction at least including an inner layer and an outer layer each composed of a thermoplastic polyester resin layer and an intermediate layer comprising at least one polyglycolic acid layer embedded in the thermoplastic polyester resin layers, whereby the outer layers of thermoplastic polyester resin in which the intermediate polyglycolic acid layer is embedded protect the polyglycolic acid from hydrolysis, (III) when the thermoplastic polyester resin is a polyethylene terephthalate (PET), the end of the opening in the multilayer preform is heat treated to crystallize the thermoplastic polyester resin layer, and (IV) after being regulated to a temperature at which stretch is possible, the multilayer preform is inserted into a blow mold cavity where the multilayer preform is blow molded while a pressurized fluid is blown thereinto, and, when the thermoplastic polyester resin is a polyethylene terephthalate (PET), while the mold has been heated to a temperature of 100 to 165° C., a biaxially oriented body of the multilayer container is thermally fixed simultaneously with stretch blow molding.

2. The production process according to claim 1, wherein at the step (II), the multilayer preform is prepared by concurrent molding, wherein the melt viscosity of each resin upon co-injection is controlled in such a manner to provide a ratio $(\eta_T/\eta_P)$ of 0.3 to less than 1, where $\eta_P$ is the melt viscosity of the polyglycolic acid and $\eta_T$ is the melt viscosity of the thermoplastic polyester resin, each measured at a melting temperature thereof and a shear rate of 100 $sec^{-1}$.

3. The production process according to claim 1, wherein the thermoplastic polyester resin is polyethylene terephthalate (PET) and wherein at the step (III), the opening end of the multi-layer preform is heat treated to crystallize the thermoplastic polyester resin layer to a crystallinity of 25 vol % or higher.

4. The production process according to claim 1, wherein at the step (IV), biaxial stretch blow molding is carried out at a stretch factor of 1.5 to 3 in an axial direction and 3 to 5 in a circumferential direction.

5. The production process according to claim 1, wherein the intermediate layer of polyglycolic acid has a thickness of 5-200 μm.

6. The production process according to claim 1, wherein the intermediate layer of polyglycolic acid has a thickness of 10-100 μm.

7. The production process according to claim 1, wherein the multilayer container is formed of layers having a total thickness of 300 μm-2 mm.

* * * * *